United States Patent

Powell

[11] Patent Number: 5,937,926
[45] Date of Patent: Aug. 17, 1999

[54] TIRE INCLUDING CONDUCTING STRIP

[75] Inventor: Brian David Willamd Powell, Nuneaton, United Kingdom

[73] Assignee: Sumitomo Rubber Industries Limited, Hyogo, Japan

[21] Appl. No.: 08/929,298

[22] Filed: Sep. 11, 1997

Related U.S. Application Data

[63] Continuation of application No. 08/439,981, May 12, 1995, abandoned.

[30] Foreign Application Priority Data

May 12, 1994 [GB] United Kingdom .................. 9409453

[51] Int. Cl.⁶ .............................. B60C 1/00; B60C 11/03; B60C 19/08
[52] U.S. Cl. ................................ 152/152.1; 152/209.5; 152/209.18; 152/DIG. 2
[58] Field of Search ................................ 152/151, 152.1, 152/209 R, 209 D, 450, DIG. 2

[56] References Cited

U.S. PATENT DOCUMENTS

| | | | |
|---|---|---|---|
| 2,339,546 | 1/1944 | Hanson | 152/152.1 |
| 2,342,576 | 2/1944 | Fielding | 152/152.1 |
| 3,768,537 | 10/1973 | Hess et al. | 152/209 R |
| 3,884,285 | 5/1975 | Russell et al. | 152/209 R |
| 4,983,239 | 1/1991 | Holroyd et al. | 156/123 |
| 5,066,721 | 11/1991 | Hamada et al. | 525/102 |
| 5,222,537 | 6/1993 | Saito et al. | 152/209 R |
| 5,225,011 | 7/1993 | Takino et al. | 152/209 R |
| 5,227,425 | 7/1993 | Rauline | 524/493 |
| 5,358,022 | 10/1994 | Glover et al. | 152/209 R |
| 5,518,055 | 5/1996 | Teeple et al. | 152/152.1 |

FOREIGN PATENT DOCUMENTS

| | | | |
|---|---|---|---|
| 341187 | 11/1989 | European Pat. Off. | 152/209 R |
| 0658452 | 6/1995 | European Pat. Off. | |
| 793507 | 1/1936 | France | 152/151 |
| 820543 | 11/1951 | Germany . | |
| 47202 | 12/1977 | Japan | 152/DIG. 2 |
| 112306 | 9/1981 | Japan | 152/DIG. 2 |
| 147903 | 9/1982 | Japan | 152/152.1 |
| 143203 | 6/1986 | Japan . | |
| 579008 | 3/1978 | Switzerland . | |
| 597008 | 3/1978 | Switzerland | 152/152.1 |
| 544757 | 4/1942 | United Kingdom . | |
| 551657 | 3/1943 | United Kingdom . | |

OTHER PUBLICATIONS

Blow, Rubber Technology and Manufacture, 1971, pp. 349–356.
The Vanderbilt Rubber Handbook, 1958, pp. 413–416.
Database WPI Week 9118, Derwent Publications Ltd., London GB; AN 91–128812, Mar. 22, 1991.

Primary Examiner—Steven D. Maki
Attorney, Agent, or Firm—Birch, Stewart, Kolasch & Birch, LLP

[57] ABSTRACT

A tire tread comprising an elongated tread strip of tire tread compound of high resistivity having a transverse width (TR) and, within the transverse width (TR) at least one longitudinally extending conducting strip of low resistivity tire compound with a volume resistivity less than $10^8$ ohm-cm, the at least one conducting strip extending from the top to the bottom surface of a tread strip.

7 Claims, 1 Drawing Sheet

TIRE INCLUDING CONDUCTING STRIP this application is a continuation of application Ser. No. 08/439,981 filed on May 12, 1995, now abandoned.

This invention relates to tire treads and in particular to tire treads which are electrically conducting including those reinforced by silica.

BACKGROUND OF THE INVENTION

The build-up of static electric charge in moving vehicles can have a potentially adverse effect on electronic circuitry and radio reception, as well as being a safety hazard should spark discharge occur during re-fuelling. Personal discomfort also occurs if charge is earthed through a driver or passenger.

Charge is normally conducted to earth through the tires, which requires that the tires themselves have an acceptable level of conductivity—commonly described as anti-static. Such levels of conductivity are normally guaranteed by the use of tire compounds containing significant proportions of carbon black as reinforcing filler. Carbon black reduces the resistivity of the intrinsically non-conductive rubber and so provides a leakage path for the static charge from the vehicle to earth.

Anti-static rubber compounds generally require a volume resistivity below $10^8$ ohm-cm, which is usually achievable with approx 50 phr or more carbon black in the compound. Such loadings are typical of carbon black-reinforced tires, which are accordingly anti-static.

If non-black fillers (e.g. silica) are used, or if the carbon black loading is significantly less than 50 phr, anti-static properties are often not achieved. For example, with silica filler in place of carbon black, the volume resistivity is typically $10^{13}$ ohm-cm. Should such a compound be used in the tread of a tire, for example, to achieve a lower rolling resistance, the vehicle will effectively be insulated from the road and static charge will not be able to leak to earth.

It is known that electrical conductivity may be improved by the addition of polar ingredients but the effect is generally of insufficient magnitude. Likewise special grades of super-conductive carbon blacks may be added but these need to be present in moderately high loadings, e.g. 10–30 phr, to be significantly effective, and since their other properties are not suited to tire applications, road performance may deteriorate.

According to one aspect of the present invention a tire tread comprises an elongated tread strip of tire tread compound of high resistivity having a transverse width (TR) and, within the transverse width (TR) a longitudinally extending conducting strip of low resistivity tire compound with a volume resistivity less than $10^8$ ohm-cm, the said conducting strip extending from the top to the bottom surface of the tread strip.

By high resistivity is meant tire tread compounds having a volume resistivity greater than $10^{89}$ ohm-cm. Such compounds include, for example, tire tread compounds having a silica filler in place of carbon black of which the volume of resistivity is typically $10^{13}$ ohm-cm.

Preferably the conducting strip is positioned at the center of the tire tread strip.

Two or more longitudinally extending conducting strips may be provided and when two strips are used they may conveniently be the tread strip wing component which in the finished tire form the tire tread shoulders. This construction is particularly convenient because the tire tread wings are usually extruded of a different material to the main part of the tire tread strip and thus no additional extruded component is necessary.

The width of the conducting strip is preferably in the range of 5–25% of the width of the tire tread TR.

The compound of the conducting strip more preferably has a volume resistivity of less than $10^6$ ohm-cm.

Another aspect of the invent ion provides a tire comprising a tire tread strip according to any of the above claimed features. Preferably the width of the conducting strip is greater than the width of the widest longitudinally extending tread groove to ensure that the conducting strip ma y contact the road when the tire is completed and used on a vehicle.

BRIEF DESCRIPTION OF THE DRAWINGS

Further aspects of the present invention will become apparent from the following description, by way of example only, of two embodiments in conjunction with the attached diagrammatic drawings in which.

DETAILED DESCRIPTION OF THE INVENTION

Figure 1:
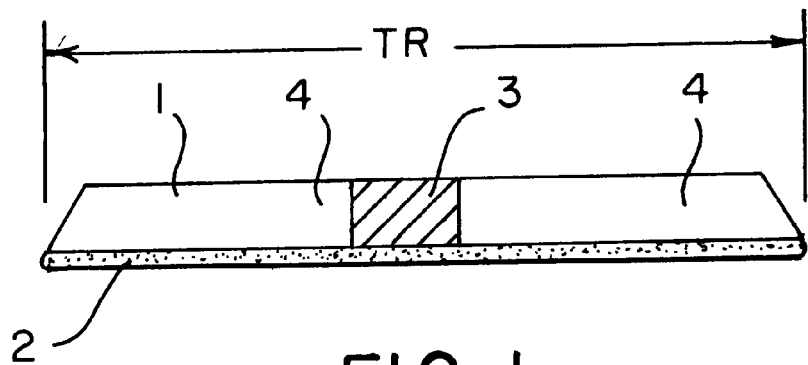
FIG. 1 is a transverse cross-sectional view of an extruded tire tread strip according to the present invention.

FIG. 1 shows the transverse cross-section of a longitudinally extended tire tread strip comprising a main tire tread compound region 1 and a conductive tire sub-tread region 2. This assembly is the standard one where an extruded tread compound strip of the required cross-section is brought into close contact with a flat strip or sheet of sub-tread compound to form a sub-assembly on later tire manufacture.

In this cases however the first or main tire tread strip region 1 is in three parts. Firstly a center part 3 having a width of 15% of the tire strip width TR and two main side regions 4. The center region comprises a rubber compound having a volume resistivity of approximately $10^6$ ohm-cm being reinforced by carbon black and having the following formulation.

| | |
|---|---|
| SBR 1712, styrene 23.5%, oil 27.3% | 96 |
| BR, 96% 1,4-cls | 30 |
| N234 Carbon Black | 80 |
| Silica Ultrasil VN3 | — |
| *TESPT/N330 1:1 (X50-S) | — |
| Zinc Oxide | 3 |
| Stearic acid | 2 |
| Aromatic oil | 10 |
| CBS | 1.5 |
| DPG | — |
| Sulfur | 1.5 |

*bis [3-triethoxysilylpropyl] tetrasulfane/N330 1:1 blend marketed by Degussa as X-50S.

The side regions 4 are of a rubber compound reinforced by silica having a volume of resistivity approximately $10^{13}$ -cm. The formulation of the side region tread compound is as follows.

| | |
|---|---|
| SBR 1712, styrene 23.5%, oil 27.3% | 96 |

-continued

| | |
|---|---|
| BR, 96% 1,4-cls | 30 |
| N234 Carbon Black | |
| Silica Ultrasil VN3 | 80 |
| *TESPT/N330 1:1 (X50-S) | 12.8 |
| Zinc Oxide | 3 |
| Stearic acid | 2 |
| Aromatic oil | 10 |
| CBS | 1.5 |
| DPG | 2 |
| Sulfur | 1.5 |

*bis [3-triethoxysilylpropyl] tetrasulfane/N330 1:1 blend marketed by Degussa as X-50S.

Figure 2:
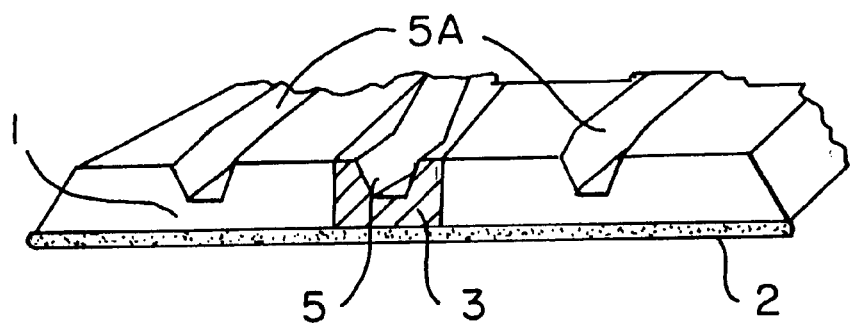
FIG. 2 shows the tire tread strip of FIG. 1 after tire manufacture.

The tire tread strip is fitted to tire a carcass on top of a tread reinforcing breaker in the normal way and the tire is vulcanised in a tire curing press where the tire tread pattern is formed. FIG. 2 shows a short section of the tire tread strip after such vulcanisation in a tire mould and for simplicity shows the three longitudinally extending zig-zag grooves as the tire tread pattern. As can be seen the central region 3 having low resistivity has a large center groove 5 formed therein but the width of the center region 3 is such that there is still low resistivity compound at the tire road contacting surface and the low resistivity material extends to the sub-tread so providing a path for charge to dissipate from the tire to the road. The two side main grooves 5A do not have this low resistivity material but are formed in the silica, comparatively high resistivity, material.

Figure 3:
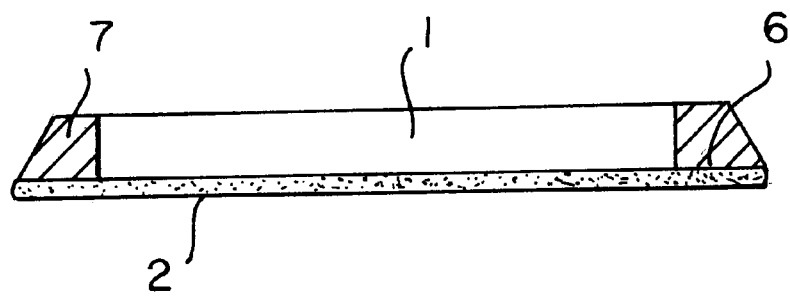
FIG. 3 shows an alternative tire tread strip.

In the embodiment shown in FIG. 3 the high resistivity silica compound forms the main region 1 of the tire tread strip. Once again a sub-tread 2 is provided out in this case the wing portions 6 and 7 of the tire tread strip comprise the low resistivity materials. Similar compounds to the previous one may be used for this embodiment and it will be appreciated that in this case it is through the shoulder regions of the tire that the electrical path is provided.

In a further modification to the constructions embodied in FIGS. 1, 2 and 3, the sub-tread component (region 2) may be omitted.

The formulation for the conducting or low volume resistivity components is given purely by way of example only and any of the normal low resistivity formulations known in the art may be used. Likewise the formulation of the non-conducting or high volume resistivity component is given purely by way of example only and any of the high resistivity formulations known in the art may be used.

In the resultant tire, the properties of the silica reinforced tire exist in full measure giving wear, wet grip, ice grip etc according to the silica compound formulation chosen. The disadvantage of silica compounds, however, in having too high a volume resistivity whereby static charge may be maintained on the vehicle so causing the problems mentioned above is overcome by the conducting paths of the low volume resistivity material provided in the tire tread strip.

A most important advantage of the construction of the present invention however is that the strips of low resistivity material comprise extrudable sections and the tire tread strip can be manufactured using conventional extrusion techniques bringing the various components together to form a handlable tire tread strip. The tire tread strip may be spooled and used in continuous lengths or cut to the required length for each tire to be manufactured.

Having now described my invention what I claim is:

1. A passenger road vehicle tire comprising a carcass, a tread reinforcing breaker, a tread including an elongated tread strip of tire tread compound of high resistivity having a transverse width (TR), including silica as a reinforcement material and having a volume resistivity of approximately $10^{13}$ ohm-cm, a tire sub-tread being conductive underlying and in contact with the radially inner surface of the tread strip substantially across the entire transverse width (TR) and along the entire circumference of the inner surface of the tread strip, and at least one circumferentially extending conducting strip of low resistivity tire compound having a volume resistivity less than $10^8$ ohm-cm, the width of each said at least one conducting strip being in the range of 5 to 25% of the tread width, and each of said at least one conducting strip extending between the radially outer surface of the tread strip and the tire sub-tread such that a conductive path is provided for dissipation of static electric charge from the tire through the sub-tread and conducting strip to the radially outer surface of the tread strip.

2. The tire according to claim 1 wherein said at least one conducting strip is substantially at the center of the tread strip.

3. The tire according to claim 1 wherein said at least one conducting strip is two in number, each of said two conducting strips extending longitudinally in the tire tread.

4. The tire according to claim 3 wherein said two conducting strips are tread wings which form a pair of tire tread shoulders.

5. The tire according to claim 1 wherein the volume resistivity of the compound of said at least one conducting strip is less than $10^6$ ohm-cm.

6. The tire according to claim 1 wherein the high resistivity compound includes silica as a reinforcement material at 80 phr.

7. The tire according to claim 1 further comprising a plurality of longitudinally extending tread grooves wherein said at least one conducting strip is one in number and has a width greater than the width of the widest of said longitudinally extending tread grooves.

\* \* \* \* \*